March 31, 1964     A. H. LLOYD     3,126,645
SCHEDULE ARRANGER
Filed July 20, 1961
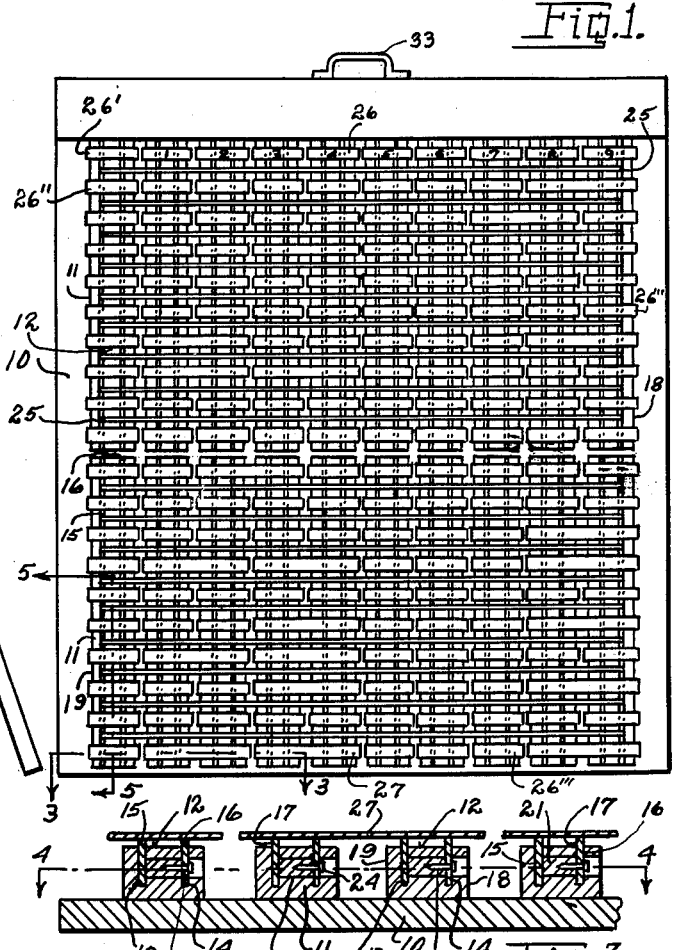
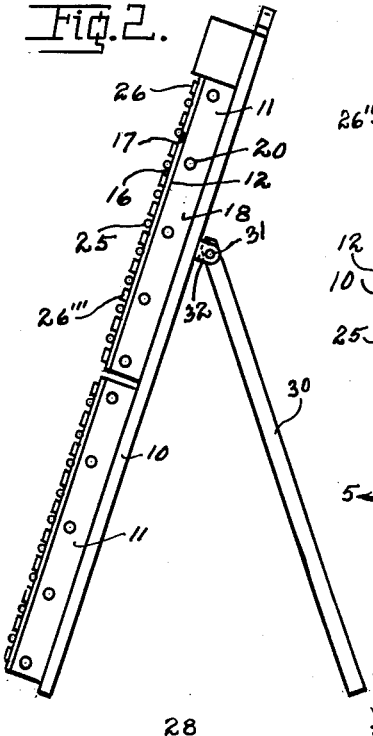
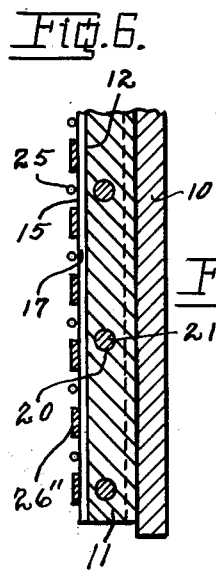
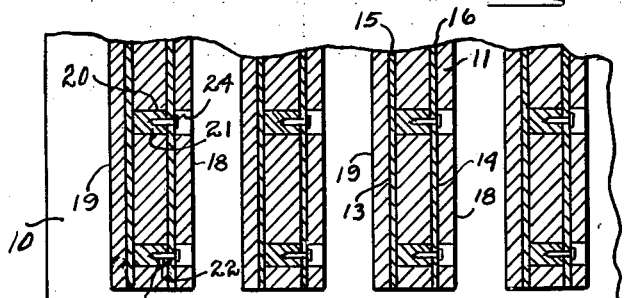
INVENTOR.
ALLEN H. LLOYD
BY
Joseph A. Rave
Attorney

United States Patent Office 3,126,645
Patented Mar. 31, 1964

3,126,645
SCHEDULE ARRANGER
Allen H. Lloyd, 306 Rugby Ave., Terrace Park, Ohio
Filed July 20, 1961, Ser. No. 126,803
4 Claims. (Cl. 35—7)

This invention relates to improvements in a schedule arranger, particularly to a device for fixing or arranging a schedule of courses and teachers as in high school, college and the like.

In a high school, as is well known, a large number of students are involved as well as a relatively large number of teachers. The pupils or students are in four groups, generally, such as freshman, sophomore, junior and senior students with each group, generally, involving five or six subjects. The students are further divided into groups of approximately thirty to fifty students each taking a similar subject of study at the same time, it being understood that different groups of students take the same subject but at different times. The said time study that a particular group of students is studying a particular subject is designated as a period.

From the foregoing, it follows that there is required a teacher particularly qualified for teaching a given subject at a given time or period and that any school may have two or more teachers teaching the same subject at the same time each to a different group of pupils or students.

A problem encountered by each school at the beginning of a school year, as well as at the mid-term of the school year, is the scheduling or arranging for the teachers each to have his class or group of pupils or students at the proper time or period in a day and that each student be assigned to a class or group throughout the school day. Also, there is provided one or more lunch times or periods in a day for the pupils or students and their teachers or instructors.

In the past it has been customary to write and rewrite a schedule involving all of the teachers and all of the pupils or students and which job was quite tedious and time consuming.

By the present invention, there is provided a schedule arranger which has space for each teacher in the school as well as space for the various time periods in a school day and in which the various factors or elements can be readily shifted until all teachers and students have been properly assigned and arranged.

It is, therefore, the principal object of the present invention to provide a schedule or program arranging device which is readily operative but which under normal circumstances will be permanent unless deliberately disturbed.

Another object of the present invention is the provision of a device which will accomplish the foregoing object but which can readily and without inconvenience be changed or rearranged when conditions require or warrant such rearrangement.

A further and specific object of the present invention is to provide a device that accomplishes the foregoing objects which is extremely simple of construction and can be economically produced and yet efficiently and effectively accomplish its intent.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a plan view of a device of the present invention.

FIG. 2 is a side elevational view of the device of FIG. 1 showing same set up in the form of an easel whereby a minimum amount of supporting space is required.

FIG. 3 is enlarged, fragmentary, sectional view of a portion of the device, transversely thereof, as seen from line 3—3 on FIG. 1.

FIG. 4 is a horizontal, sectional view through the portion of FIG. 3 as seen from line 4—4 on said FIG. 3.

FIG. 5 is an enlarged, fragmentary, sectional view through a portion of the device as seen from line 5—5 on FIG. 1.

FIG. 6 is a perspective view of a small plate forming a detail of the invention.

FIG. 7 is a perspective view of another small plate, similar to FIG. 6, again forming a detail of the invention.

Throughout the several views of the drawings similar reference characters are employed to denote the same or similar parts.

As noted above the average junior-high school, senior-high school and college have the pupils' or students' day arranged to include four or five instruction class periods, but each student's day, generally, includes one to three additional time periods, such as, for lunch and study and possibly school activities with, again as noted above, a teacher or supervisor present during each time period. To accommodate all of the students or pupils and teachers, a complete schedule or accommodation must be worked out.

The schedule arranger for accomplishing the foregoing, as disclosed in the drawings, comprises a body member or baseboard 10 conveniently taking the form of a panel and preferably of non-magnetic or non-conductive material. In practice, as presently performed, the said baseboard is a wood panel to which is secured to upstand therefrom a plurality of supports 11. Each support 11 is, again, formed of non-conductive and non-magnetic material such as wood. The upstanding supports may take any desired length and are arranged vertically of the baseboard 10; there being two such vertically aligned supports 11 for each vertical column, presently specifically described.

Each column of supports 11 is multiplied transversely of the body member or baseboard 10 in accordance with the desired capacity of the schedule arranger; there being shown in the drawings ten such vertical columns.

Each support 11 is identical with the other and comprises the forming therein downwardly of its upper surface 12 with spaced slits or grooves 13 and 14 each, respectively, receiving a bar 15 and 16 formed of material relative to which magnetic current or flux will readily flow. Each of the bars 15 and 16 upstands an equal amount above the top 12 of the support, as indicated at 17. Since each of the bars 15 and 16 upstands an equal amount above its support 11 and since each support 11 has its top surface similarly upwardly spaced from the baseboard 10 the upper surfaces of the bars 15 and 16 will be in a similar plane.

Each of the supports 11 is transversely bored from one side or the other thereof for a distance not exceeding the remote slot 13 and 14. In other words each support 11, as seen in FIGS. 3 and 4, may be bored from its right hand side 18 to a depth not to exceed, materially the slot 13 or said support 11 may be bored from its left hand side 19 to a depth not materially exceeding the slot 14. By this construction there is provided within each support 11 a plurality of circular pockets 20 lying between the slots or grooves 13 and 14.

Disposed in each pocket 20 is a permanent magnet 21 of a diameter to fit the pocket 20 and have a length substantially equal to the distance between the adjacent sides of the slits or slots 13 and 14 and therefore of a size equal to the distance between adjacent sides of the magnetizable bars 15 and 16 which have a press fit therein and, therefore, just fill the said slots or slits 13 and 14. In order to retain the parts in operative and assembled positions one of the magnetizable bars, bar 16, for example, is provided with a plurality of apertures 22 each in axial alignment with a socket 23 in one end of each permanent magnet 21 and through each of which aligned apertures and sockets extends a retaining member 24, conveniently in the form of a headed small nail, preferably formed of non-magnetic material such as brass.

As will be noted from FIG. 1, there is illustrated ten vertical columns of supports 11 but this number may be increased or decreased as desired and, likewise, each column of supports 11 may be formed as a single piece or may include more than two pieces, again depending upon the capacity desired.

The vertical columns of supports 11 are arranged to provide a plurality of transverse rows each of a similar width through the use of dividers 25. Conveniently, each divider is formed as a length of copper wire resting on the upper surface of the bars 15 and 16 and is conveniently secured as by brazing or soldering wherefore the dividers 25 are permanently held in place. Strictly due to drawing space the vertical columns of supports 11 are illustrated as each having nine row dividers thereby forming on each support 11, ten transverse divisions or rows. Obviously this number may be increased or decreased, the drawing merely illustrating an embodiment of the invention.

From the foregoing, it is now evident that there has been provided a board having, in effect, a magnetized upper surface and which surface is divided into a plurality of vertically arranged rows with each row provided with a plurality of adjacent similar areas and with each area magnetized.

With the above board, there is employed a separate plate member 26 for each magnetized area or there may be employed a separate member that will simultaneously span two or more of adjacent magnetized areas in a row, such a member being indicated by the reference numeral 27.

The upper left hand corner member 26, for convenience in description being specifically identified by the reference numeral 26', is illustrated in FIG. 6 and has displayed thereon indicia which explains the schedule. As illustrated in FIG. 6 the member 26', to all intents and purposes a metallic plate capable of being held in place by a magnet or magnetic flux, has the word "period" with an arrow 28 pointing toward the following vertical columns transversely of the supporting board and the said plate 26' in addition has the word "teacher" with an arrow 29 pointing downwardly with respect to its column, namely, the left hand column on the body member or baseboard 10. Each of the plates 26, specifically identified by the reference numeral 26" below the top plate 26' would have thereon a teacher's name. Each of the plates 26 to the right of the uppermost corner plate 26' has thereon a number commencing with "1" which indicates the time period of the day. Each of the plates in the rows below the time period numbers and to the right of the teacher plate 26", specifically identified by the reference numeral 26''', would carry the name of the subject being taught or handled by the teacher in that period. In FIG. 7 one of the said plates 26''', is illustrated and carries the legend "Latin II" meaning that to the right of a teacher's name and below a period number said subject "Latin II" would be taught.

In assembling the device of the present invention the supports 11 are first made by each having the grooves or slits 13 and 14 cut therein and the sockets 12 drilled or formed. The said supports 11 are then secured to the baseboard or body member 10 in any suitable manner, not shown, as by gluing, screwing, nailing, or the like.

The magnetizable strip or bar 15 is then inserted in its groove or slit 13 whereupon a magnet 21 is inserted in each of the sockets 20 to have its end engage the inner side of the said bar 15. The other magnetizable bar 16 is then inserted in its slot or slit 14 and again with its adjacent side in face contact with each magnet 21. It is to be understood that each magnet 21 was previously provided with a socket 23 and that the bar 16 was provided with as many apertures 22 as magnets 21 are being employed and, at this time, the said bar apertures 22 are each aligned with a magnet socket 23 and a retaining pin or nail 24 driven home.

The row defining members 25 are then secured in operative position transversely of all of the magnetizable bars 15 and 16 whereupon the device is ready for use.

The number of plates 26 were previously prepared and either contain a teacher's name, a subject to be taught, study hall, lunch, and the like, it being understood that, likewise, the desired number of double period plates 27 have been prepared.

It now is a simple matter for the person making up the schedule to apply the various plates 26 and 27 to the magnetized surface of the board 10 since a plate 26 and 27 may be placed in a desired time period and it will be retained there yet the said plate may be readily lifted from any position and shifted to or exchanged with a plate in another position.

In order that the made-up schedule may be readily and conveniently displayed for observance by teachers and pupils the said body member or baseboard 10 may have attached thereto a support taking the form of an easel leg 30 pivotally secured at 31 through a bracket 32 to the back side of the said body member or baseboard 10.

In addition to the easel support or leg 30, the said body member or baseboard 10 may have secured to its upper end a U-shaped member 33 which would enable the device to be transported from place to place or used to hang the same on a wall or support.

From the foregoing, it is now believed evident that there has been provided a schedule or program arranger that accomplishes the objects initially set forth.

I claim:

1. In a device of the class described the combination of a baseboard having height and width, a plurality of supporting members each formed of non-magnetizable material extending in the direction of the baseboard height and in spaced parallel relation in the direction of the baseboard width, a pair of spaced bars formed of magnetizable material carried by each support in the direction of its length and parallel with one another, means associated with each support for magnetizing said magnetizable bars, and means cooperating with said magnetized bars in each support to be arranged in rows across said supports.

2. In a device of the class described the combination of a baseboard having height and width, a plurality of supporting members each formed of non-magnetizable material extending in the direction of the baseboard height and in spaced parallel relation in the direction of the baseboard width, a pair of spaced bars formed of magnetizable material carried by each support in the direction of its length and parallel with one another, means associated with each support for magnetizing said magnetizable bars, and means cooperating with said magnetized bars in each support to be arranged in rows across said supports, said means for magnetizing the bars comprising a magnet within each support and contacting at its opposite ends each with a magnetizable bar.

3. In a device of the class described the combination of a baseboard having height and width, a plurality of supporting members each formed of non-magnetizable material extending in the direction of the baseboard height and in spaced parallel relation across the width thereof, a pair of spaced bars formed of magnetizable material carried by each support in the direction of its length and parallel with one another, means associated with each support for magnetizing said magnetizable bars, means extending transversely of said supporting members and carried by the magnetizable bars for providing rows of adjacent areas longitudinally of the support members, and means cooperating with said magnetized bars in each support area to be arranged in rows across said supports.

4. In a device of the class described the combination of a baseboard having height and width, a plurality of supporting members each formed of non-magnetizable material extending in the direction of the baseboard height and in spaced parallel relation across the width thereof, a pair of spaced bars formed of magnetizable material carried by each support in the direction of its length and parallel with one another, means comprising a magnet within each support and contacting at its opposite ends each with a magnetizable bar for magnetizing said magnetizable bars, means extending transversely of said supporting members and carried by the magnetizable bars for providing rows of adjacent areas longitudinally of the support members, and means cooperating with said magnetized bars in each support area to be arranged in rows across said supports.

References Cited in the file of this patent

UNITED STATES PATENTS

| | | |
|---|---|---|
| 1,168,949 | McKittrick | Jan. 18, 1916 |
| 1,395,982 | Gee | Nov. 1, 1921 |
| 1,433,850 | Schnitker | Oct. 31, 1922 |
| 1,694,639 | Brown | Dec. 11, 1928 |

FOREIGN PATENTS

| | | |
|---|---|---|
| 390,705 | France | Aug. 5, 1908 |
| 375,900 | Germany | May 19, 1923 |